(12) United States Patent
Sasaki et al.

(10) Patent No.: US 12,105,526 B2
(45) Date of Patent: Oct. 1, 2024

(54) HOUSEHOLD SERVICE MATCHING SYSTEM

(71) Applicant: TOYOTA JIDOSHA KABUSHIKI KAISHA, Toyota (JP)

(72) Inventors: Kiyoto Sasaki, Susono (JP); Makoto Kawaharada, Susono (JP); Satoshi Nakamura, Susono (JP); Kenichi Okumura, Gotemba (JP); Naotoshi Kadotani, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 17/959,648

(22) Filed: Oct. 4, 2022

(65) Prior Publication Data

US 2023/0110846 A1 Apr. 13, 2023

(30) Foreign Application Priority Data

Oct. 7, 2021 (JP) .................................. 2021-165232

(51) Int. Cl.
*G05D 1/00* (2024.01)
*G06Q 50/00* (2012.01)
(Continued)

(52) U.S. Cl.
CPC .......... *G05D 1/0297* (2013.01); *G06Q 50/01* (2013.01); *G06Q 50/10* (2013.01); *G08G 1/202* (2013.01);
(Continued)

(58) Field of Classification Search
CPC ...... G05D 1/0297; G06Q 50/01; G06Q 50/10; G08G 1/202; H04W 4/44; H04W 4/40; B60W 60/00253
See application file for complete search history.

(56) References Cited

U.S. PATENT DOCUMENTS

| 11,027,419 B2 * | 6/2021 | Skaaksrud | ............. G05D 1/229 |
| 11,056,007 B2 * | 7/2021 | Kobayashi | ............. G08G 1/205 |
| 2004/0153433 A1 | 8/2004 | Nakamura | |

FOREIGN PATENT DOCUMENTS

| JP | 2002-215938 A | 8/2002 |
| JP | 2011-227846 A | 11/2011 |
| WO | 02/088008 A1 | 11/2002 |

OTHER PUBLICATIONS

"Part 3 Super Appli of the winner", Line Xtrend, Nikkei, Japan, Nikkei BP, vol. 025, pp. 22-23, Jan. 14, 2020.

* cited by examiner

*Primary Examiner* — Ian Jen
(74) *Attorney, Agent, or Firm* — Dinsmore & Shohl LLP (57) ABSTRACT

A household service matching system built on a communication network, includes: a request disclosing unit configured to disclose on the communication network, a request transmitted from a terminal apparatus related to a client who wishes to entrust household service; an acceptance receiving unit configured to receive an acceptance transmitted from a terminal apparatus related to a consignment applicant in response to the request; a determination unit configured to determine a formal consignee from consignment applicants related to the terminal apparatuses having transmitted the acceptance; a vehicle dispatching unit configured to dispatch a vehicle for picking up the formal consignee to a designated position designated by the formal consignee; and a vehicle control unit configured to control the vehicle such that the vehicle that carries the formal consignee arrives at the client's address.

4 Claims, 10 Drawing Sheets

(51) Int. Cl.
*G06Q 50/10* (2012.01)
*G08G 1/00* (2006.01)
*H04W 4/44* (2018.01)
*B60W 60/00* (2020.01)

(52) U.S. Cl.
CPC ........ *H04W 4/44* (2018.02); *B60W 60/00253* (2020.02)

REQUEST INFORMATION 131

| REQUEST ID | CLIENT INFORMATION (NAME, ADDRESS, ...) | REQUESTING HOUSEWORK INFORMATION (HOUSEWORK CONTENT, CONSIGNEE CONDITION...) | STATUS |
|---|---|---|---|
| | 131a | 131b | 131c |
| | | | ... |

HOUSEHOLD SERVICE MATCHING SYSTEM

CROSS-REFERENCE TO RELATED APPLICATIONS

This application is based upon and claims the benefit of priority of the prior Japanese Patent Application No. 2021-165232, filed on Oct. 7, 2021, the entire contents of which are incorporated herein by reference.

BACKGROUND

1. Technical Field

Embodiments of the present disclosure relate to a household service matching system for mediating or supporting matching between those who wish to entrust household service, and those who wish to be entrusted with the household service.

2. Description of the Related Art

A proposed system of this type is, for example, a community-based system that connect those who wish to entrust household service and those who work at stores and who can cooperate on the household service in a shopping district (see JP2002-215938A as Patent Literature 1). According to this system, it is possible to develop an interaction between the stores and shoppers, and to activate the community and the shopping district.

According to the Patent Literature 1, however, housework is vicariously carried out by those who work at stores in the shopping district, such as store owners and clerks, and vicarious execution requires payment or money transactions, so that the shoppers hesitate to feel free to ask for the vicarious execution. Alternatively, volunteers can be recruited to eliminate the payment or money transactions, but that gives no incentive and thus reduces the number of consignees of the vicarious execution. This results in a loss of balance between the number of those who wish to entrust household service and the number of those who wish to be entrusted with the household service, and a matching process on a system fails to function satisfactorily, which is technically problematic.

SUMMARY

In view of the problems described above, it is therefore an object of embodiments of the present disclosure to provide a household service matching system that allows a matching process to function satisfactorily by striking a balance between the number of those who wish to entrust household service and the number of those who wish to be entrusted with the household service.

The above object of embodiments of the present disclosure can be achieved by a household service matching system built on a communication network to perform household service matching between a client who entrusts household service and a consignee who is entrusted with the household service, the household service matching system comprising: a request receiving unit configured to receive a household service request for requesting the household service, from a terminal apparatus related to the client; a request disclosing unit configured to disclose on the communication network the received household service request together with at least a part of the client's address, for viewing on each of a plurality of terminal apparatuses; an acceptance receiving unit configured to receive an acceptance transmitted from a terminal apparatus among the plurality of terminal apparatuses, the terminal apparatus being related to a consignment applicant wishing to be entrusted with the household service related to the household service request disclosed; a determination unit configured to determine a formal consignee based on the acceptance received; a vehicle dispatching unit configured to dispatch a vehicle to a designated position designated by the formal consignee determined, or to encourage dispatching of the vehicle to the designated position; and a vehicle control unit configured to control the vehicle so as for the vehicle having picked up the formal consignee at the designated position to arrive at an address of the client, or so as to encourage the vehicle having picked up the formal consignee at the designated position to arrive at the address.

According to the household service matching system in an aspect of the embodiments of the present disclosure, the consignee who is entrusted with the disclosed household service, can get in the vehicle that is dispatched to the designated position designated by himself or herself, and can go to the client's address for free by the vehicle. Since at least a part of the client's address is disclosed in the communications network, a viewer of the household service request may be able to consider whether or not to be entrusted, depending on whether or not the address is in the neighborhood of a place where the viewer wishes to go. Thus, the free ride by the vehicle that is provided in exchange for undertaking the household service may be an incentive to undertake the household service. As a result, even in an environment where there are no payment nor money transactions, it is possible to secure the consignment applicant who wishes to be entrusted with the household service. Therefore, in the environment where there are no payment nor money transactions, the balance could be facilitated between the number of those who wish to entrust household service and the number of those who wish to be entrusted with the household service, and the matching process on the system could be allowed to function satisfactorily.

Such effects according to the embodiments of the present disclosure will be more apparent by DETAILED DESCRIPTION OF THE EMBODIMENT described below.

DETAILED DESCRIPTION OF THE EMBODIMENTS

First Embodiment

1. Overall Configuration of Household Service Matching System

Referring to FIG. 1 to FIG. 6, a description will be given to a household service matching system according to a first embodiment. First, with reference to FIG. 1, an example of an overall configuration of a household service matching system 1 according to the first embodiment will be described. The household service matching system 1 is configured to match a client (or a consignor) and a consignee of household service, and to provide the client with the household service for free. Hereinafter, a user who entrusts household service in the household service matching system 1 will be referred to as a client, a user who wishes to be entrusted with the household service will be referred to as a consignment applicant, and a user who is determined to be a household service agent will be referred to as a formal consignee.

Figure 1:
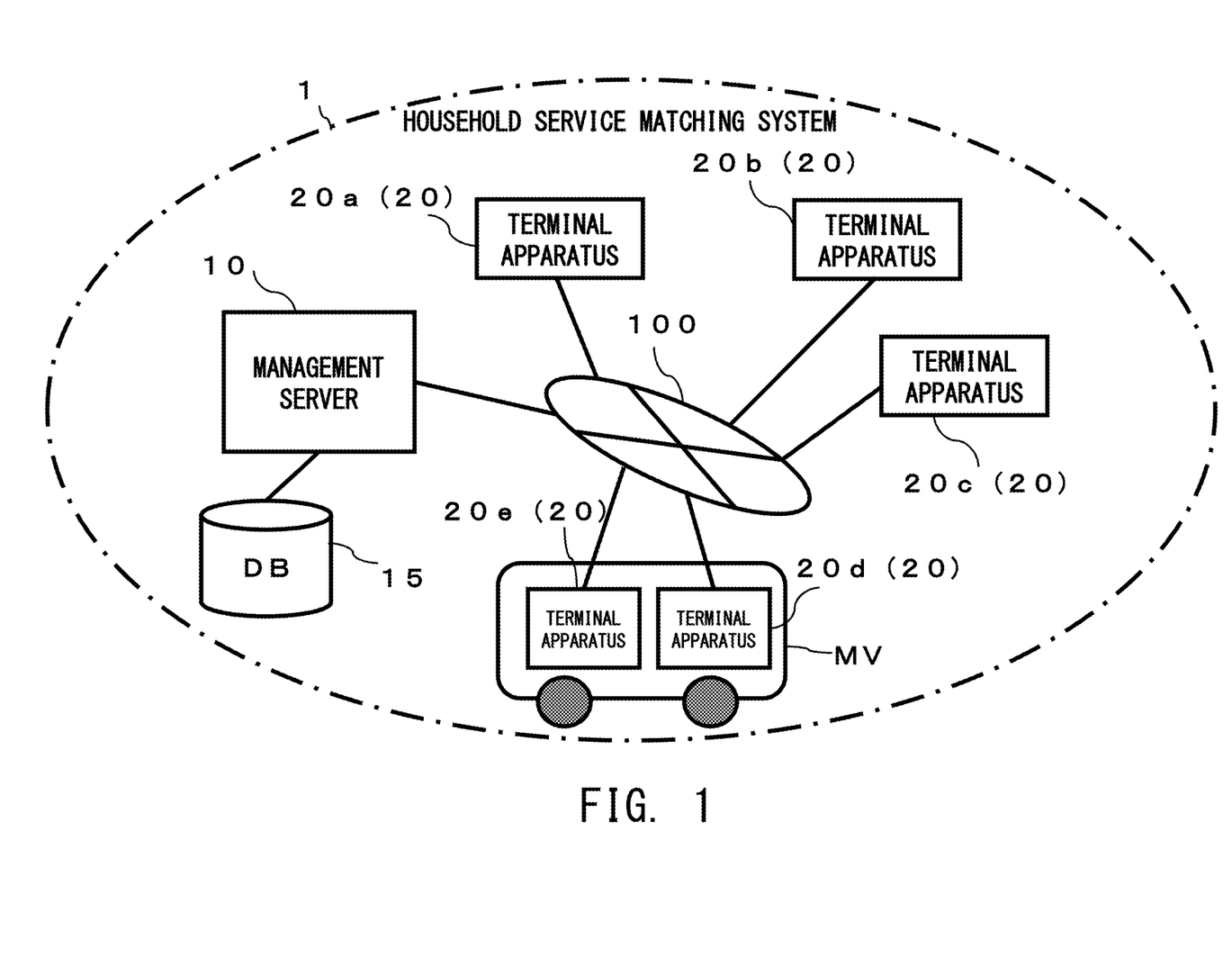
FIG. 1 is a block diagram illustrating an example of an overall configuration of a household service matching system according to a first embodiment.

As illustrated in FIG. 1, the household service matching system 1 according to the first embodiment may include a management server 10, a database 15 that is accessible by the management server 10, a plurality of terminal apparatuses 20. The household service matching system 1 is built in a communication network such as, for example, the Internet 100, and the management server 10 and each of the terminal apparatuses 20 are allowed to perform data communication with each other via the Internet 100. Each of the terminal apparatuses 20 corresponds to each of a plurality of users and conceptually includes a smartphone, a personal computer, a tablet terminal, a communication robot, or the like that accepts an input operation of each user. On the other hand, the management server 10 may be placed, for example, in a business office of a matching service company that provides a matching environment for household service or on the cloud system, under the control of the matching service company.

Although five terminal apparatuses 20, i.e. a terminal apparatus 20a, a terminal apparatus 20b, a terminal apparatus 20c, a terminal apparatus 20d, and a terminal apparatus 20e, are illustrated in FIG. 1, the number of the terminal apparatuses 20 in the household service matching system 1 is not limited to this number. The database 15 may be configured so that the management server 10 is accessible thereto through the Internet 100. Hereinafter, when the terminal apparatuses 20a to 20e are not particularly distinguished from each other, each of them will be referred to as the terminal apparatus 20. Furthermore, a user of the terminal apparatus 20a will be referred to as a user 20a, a user of the terminal apparatus 20b will be referred to as a user 20b, a user of the terminal apparatus 20c will be referred to as a user 20c, a user of the terminal apparatus 20d will be referred to as a user 20d, and a user of the terminal apparatus 20e will be referred to as a user 20e.

At least one terminal apparatus 20 may be provided, for example, in a MaaS (Mobility as a Service) vehicle MV. In the example illustrated in FIG. 1, the terminal apparatus 20d and the terminal apparatus 20e are provided in the MaaS vehicle MV. That is, the terminal apparatus 20d and the terminal apparatus 20e respectively correspond to the user 20d and the user 20e who are occupants in the MaaS vehicle MV. For example, the MaaS vehicle MV may travel around a predetermined area and may be used as a waiting place for keeping at least one user who could be the consignment applicant waits on standby. The MaaS vehicle MV may be an autonomous vehicle or a vehicle with a driver.

Incidentally, the management server 10 and the database 15 shown in FIG. 1 are conceptual configurations, and they may be physically realized as one apparatus, or may be realized by physically at least two apparatuses. For example, the database 15 may be provided in the management server 10. Furthermore, any at least one of the terminal apparatuses 20 may work as a part or all of the process and hardware configuration of the management server 10, thereby to realize the management server 10.

Alternatively, all of the process and hardware configuration of the management server 10 may be distributed to the terminal apparatuses 20 to realize the management server 10.

2. Hardware Configuration of Management Server

Figure 2:
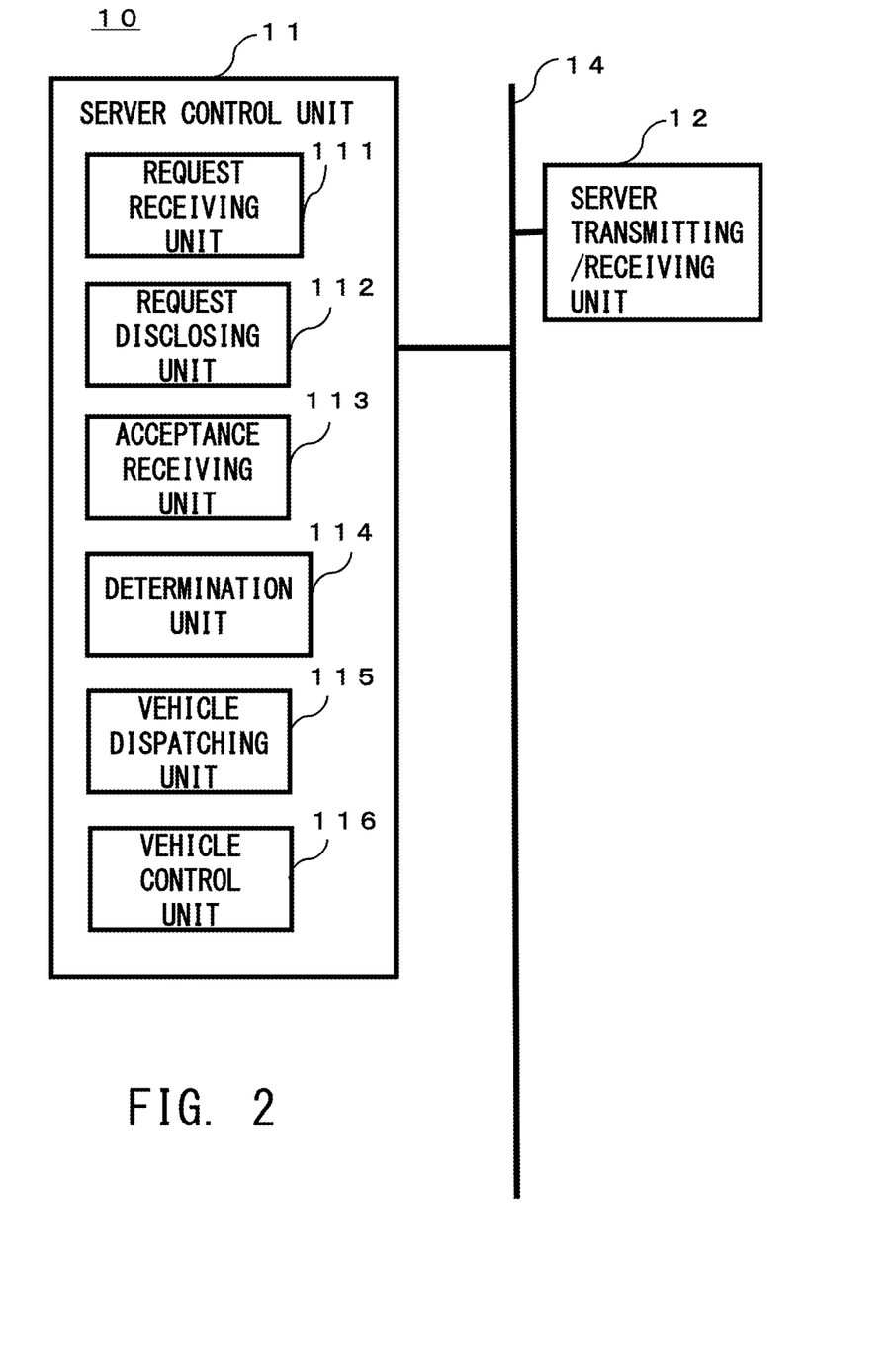
FIG. 2 is a block diagram illustrating an example of a hardware configuration of a management server according to the first embodiment.

An example of a hardware configuration of the management server 10 will be described with reference to FIG. 2. Since the management server 10 is a conceptual one as described above, the hardware configuration illustrated in FIG. 2 and its operation may be realized, for example, by a plurality of server apparatuses. Alternatively, a part or all of the hardware configuration and its operation may be distributed and realized on at least a part of the terminal apparatuses 20.

The management server 10 may include, for example, a server control unit 11 and a server transmitting/receiving unit 12. The server control unit 11 and the server transmitting/receiving unit 12 are allowed to perform data communication with each other and may be connected to each other through a data bus 14, for example. Furthermore, the management server 10 may include, for example, a not-illustrated data input/output unit that accepts various operations of a system operation manager of the household service matching system 1 and that outputs various data to the system operation manager.

For example, the server transmitting/receiving unit 12 performs transmission and reception of various data with external configurations of the management server 10 (e.g., each terminal apparatus 20) through the Internet 100. The server control unit 11 is configured to control each process performed by the management server 10. The server control unit 11 may be configured, for example, as a computer unit including a CPU (Central Processing Unit) and a storage area required for its operation: a RAM (Random Access Memory) and a ROM (Read Only Memory).

For example, the server control unit 11 may read and execute a computer program stored in the ROM. For example, the server control unit 11 may read a computer program stored in a non-volatile recording medium that is readable by a computer, by using a not-illustrated recording medium reading apparatus. The server control unit 11 may read a computer program from a not-illustrated apparatus that is located outside the management server 10 through the Internet 100. The server control unit 11 executes the read computer program. As a result, logical functional blocks for performing operation to be performed by the management server 10 are realized in the server control unit 11. That is, the server control unit 11 is configured to function as a controller for realizing logical functional blocks for performing operation to be performed by the management server 10. FIG. 2 illustrates an example of logical functional blocks realized in the server control unit 11. As illustrated in FIG. 2, for example, a request receiving unit 111, a request disclosing unit 112, an acceptance receiving unit 113, a determination unit 114, a vehicle dispatching unit 115, and a vehicle control unit 116 may be realized in the server control unit 11. Incidentally, when the MaaS vehicle MV is an autonomous vehicle, the server control unit 11 may perform a travel control on the vehicle.

3. Operation of Server Control Unit

The operation of each of the units 111 to 116 realized by the server control unit 11 will be described. Incidentally, the transmission and reception of data in each of the units 111 to 116 includes transmission and reception via the server transmitting/receiving unit 12.

For example, in a reception waiting state of waiting for the reception of a household service request indicating that it is desired to entrust household service (hereinafter sometimes referred to as "the request" in the first embodiment), the request receiving unit 111 may receive the request when it is transmitted from the terminal apparatus 20 related to the client. For example, the client's address or requesting housework content may be included in or may be transmitted with the request that is transmitted from the client. For example, the request disclosing unit 112 may disclose the request received by the request receiving unit 111 on the Internet 100 such that the request is viewable by each terminal apparatus 20. For example, when an acceptance indicating that it is desired to undertake the disclosed request is transmitted from the terminal apparatus 20 corresponding to the consignment applicant, the acceptance receiving unit 113 may receive it.

For example, the determination unit 114 may determine a formal consignee from among consignment applicants related to the received acceptance. For example, the vehicle dispatching unit 115 may dispatch a vehicle for picking up the formal consignee, to a designated position designated by the determined formal consignee. Alternatively, the vehicle dispatching unit 115 may promote the dispatching of a vehicle to the designated position. The dispatched vehicle may be an autonomous vehicle or a vehicle with a driver. For example, the vehicle control unit 116 may control a vehicle with the formal consignee therein (e.g., control a travel of the vehicle) such that the vehicle arrives at the client's address. Alternatively, for example, the vehicle control unit 116 may control the vehicle (e.g., control a car navigation installed in the vehicle) so as to promote the vehicle to arrive at the client's address.

4. Data Held by Database

Figure 3:
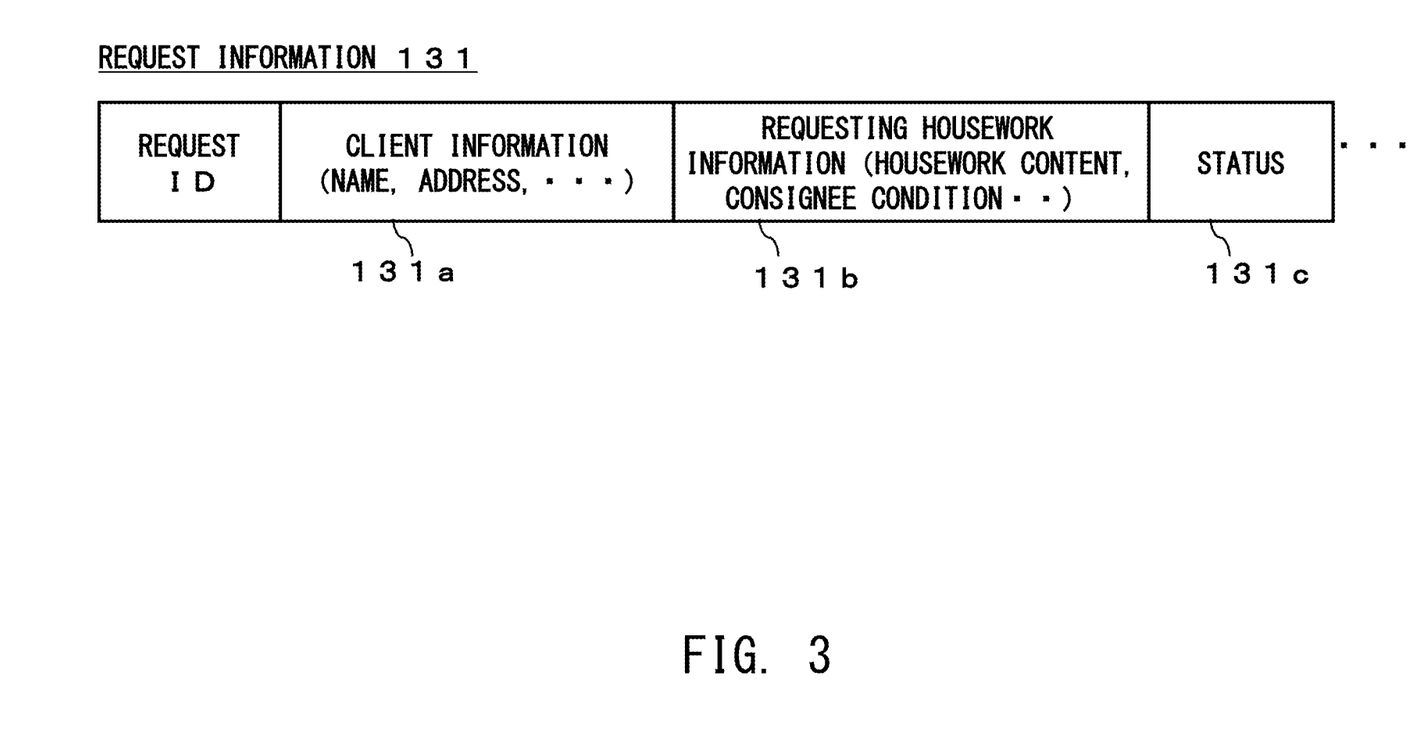
FIG. 3 is a data configuration diagram of data held by a database according to the first embodiment.

The database 15 holds various data required for various processes performed by the management server 10. The database 15 may store therein, for example, request information 131, as illustrated in FIG. 3. The request information 131 holds information about the household service entrusted by the client. The request information 131 may be generated by the server control unit 11, for example, on the basis of the household service request transmitted by the client to the management server 10. In the request information 131, for example, as illustrated in FIG. 3, client information 131a that is information about a client, requesting housework information 131b that is information about housework to be requested, a status 131c, and the like may be associated with a request ID for identifying each request in the household service matching system 1. The client information 131a may include, for example, the client' name, address, or the like. The requesting housework information 131b may include, for example, housework content requested by the client, or the like. The housework content includes, for example, changing a light bulb, re-papering a paper screen, cleaning and tidying up, pruning garden trees, and the like. Furthermore, the requesting housework information 131b may include a consignee condition. The consignee condition may be a condition for the consignee desired by the client and may include a desired condition such as, for example, gender, age, and/or height. The status 131c may indicate, for example, a current status of the corresponding request. The status may include, for example, "currently accepting" indicating that the consignment applicant for the household service is being accepted, "determined" indicating that the formal consignee has been determined, and "completed" indicating that the household service has been completed.

5. Hardware Configuration of Terminal Apparatus

Figure 4:
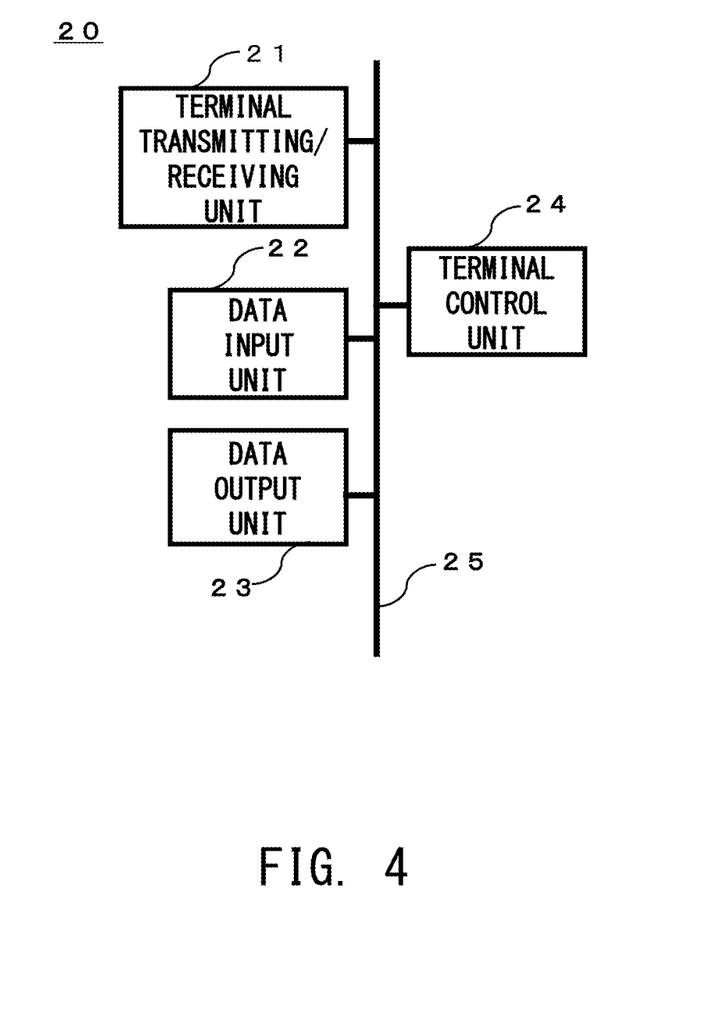
FIG. 4 is a block diagram illustrating an example of a hardware configuration of a terminal apparatus according to the first embodiment.

An example of a basic hardware configuration of the terminal apparatus 20 will be described with reference to FIG. 4. The terminal apparatus 20 may include, for example, a terminal transmitting/receiving unit 21, a data input unit 22, a data output unit 23, and a terminal control unit 24. The terminal transmitting/receiving unit 21, the data input unit 22, the data output unit 23, and the terminal control unit 24 may be connected to each other, for example, to allow data communication through a data bus 25. The terminal transmitting/receiving unit 21 may be configured, for example, to perform transmission and reception of various data with external configurations of the terminal apparatus 20, such as the management server 10, through the Internet 100. The terminal transmitting/receiving unit 21 enables the corresponding user to transmit data to or receive data from the external configurations through the Internet 100. The data input unit 22 may be configured, for example, to receive data inputs of various data from the user corresponding to the terminal apparatus 20. The data input includes, for example, an input via various input devices such as a keyboard and a mouse, a non-contact input or a contact input with a touch panel or a button, an audio input, or the like. The data output unit 23 may be configured, for example, to output various data to the user corresponding to the terminal apparatus 20. The data output includes a screen output, an audio output, or the like.

The terminal control unit 24 is configured to control each process in the terminal apparatus 20 by controlling the operation of each of the other units 21, 22, and 23. The terminal control unit 24 may be configured as a computer unit including, for example, a CPU (Central Processing Unit) and a storage area required for its operation: a RAM (Random Access Memory) and a ROM (Read Only Memory). The terminal control unit 24 may function, for example, as a user interface of the management server 10. The terminal control unit 24 may allow the user to input data and may transmit the input data to the management server 10, for example, in accordance with an instruction from the management server 10. Furthermore, the terminal control unit 24 may obtain data from the management server 10 and may output the obtained data to the user, for example, in accordance with an instruction from the management server 10. The terminal control unit 24 may be configured to realize at least a part of the above-described units 111 to 116 of the server control unit 11. Via the terminal transmitting/receiving unit 21, the terminal control unit 24, for example, transmits the request, the acceptance or the like, and receives a notice of determination or the like to be described later.

6. Processes Performed by Household Service Matching System

Figure 5:
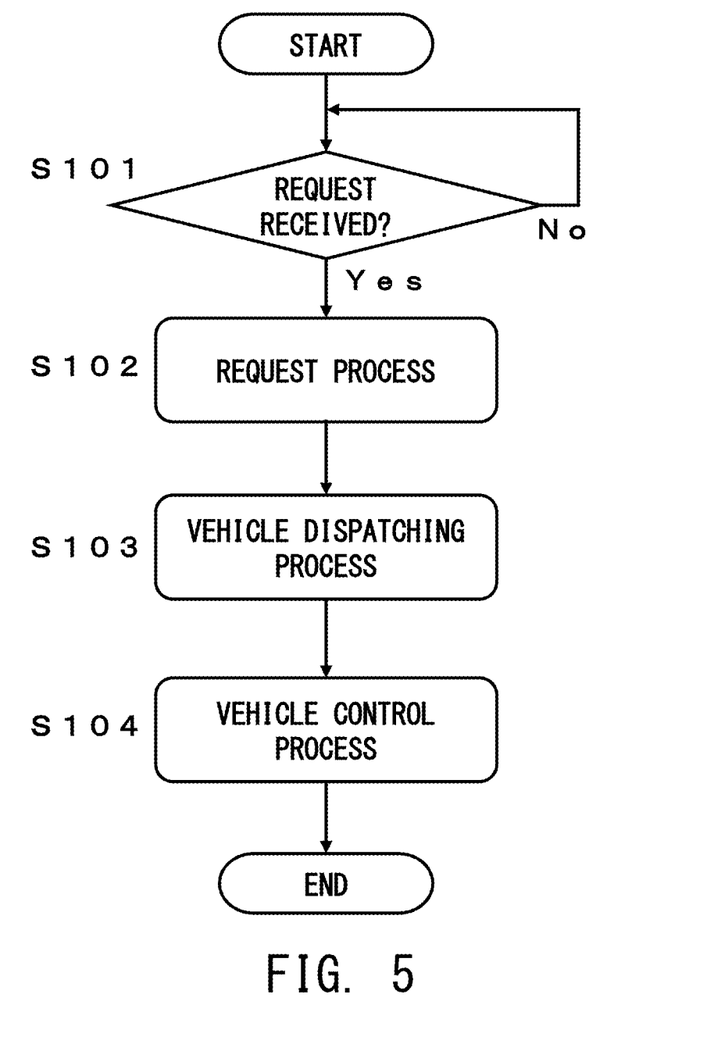
FIG. 5 is a flowchart illustrating an example of a processing routine in the household service matching system according to the first embodiment.
Figure 6:
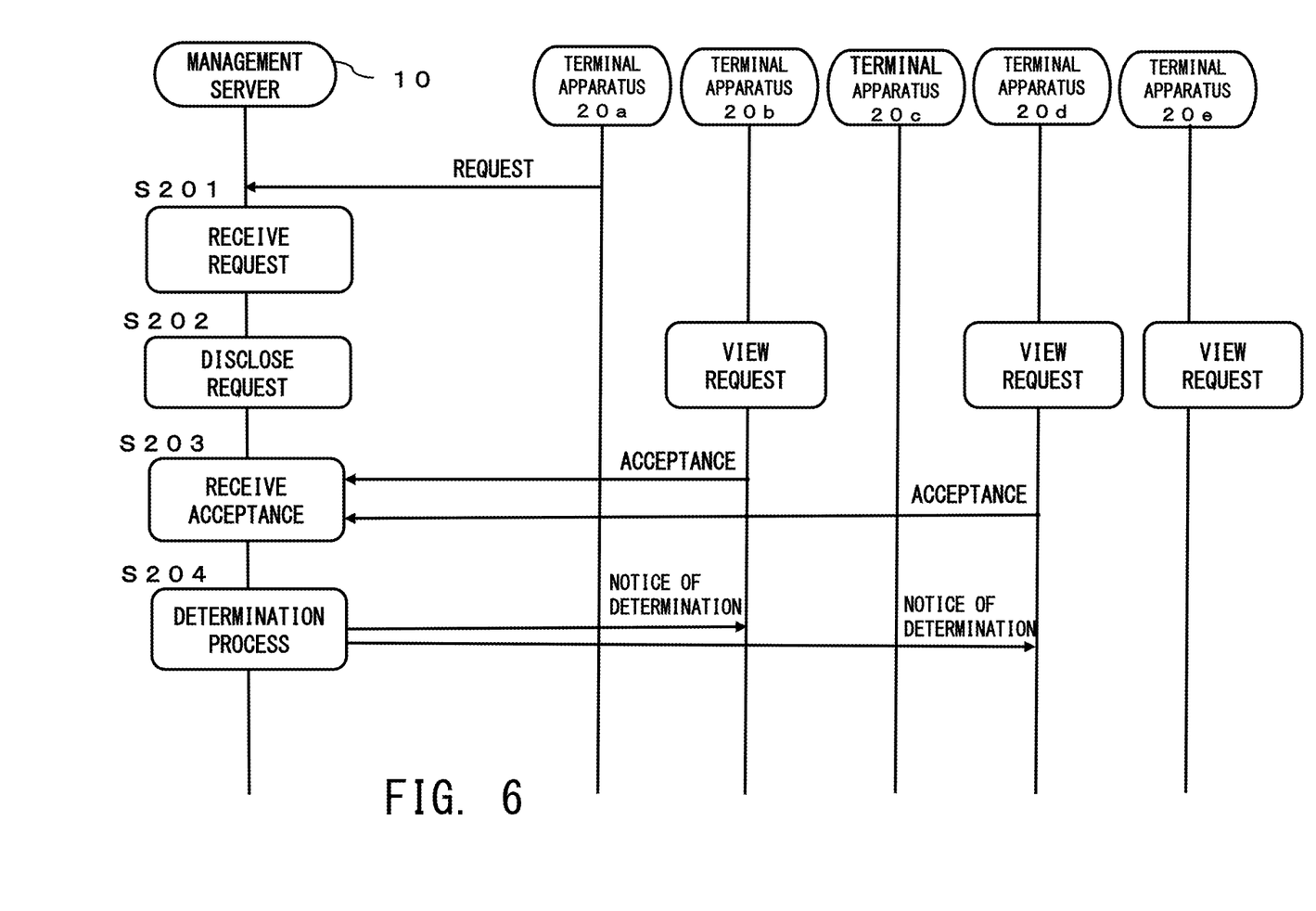
FIG. 6 is a sequence diagram for explaining a request process in the processing routine illustrated in FIG. 5.

Processes performed in the household service matching system 1 will be described with reference to FIG. 5 and FIG. 6, centering on processes performed by the server control unit 11.

First, in the reception waiting state of waiting for the reception of the household service request indicating that it is desired to entrust household service (step S101), when the server control unit 11 receives the request from the terminal apparatus 20 related to the client (the step S101: Yes), the server control unit 11 performs a request process (step S102). In the request process, the server control unit 11 determines the formal consignee of the household service associated with the received request.

With reference to a sequence diagram in FIG. 6, a description will be given to the request process in a case that the household service request is transmitted from the terminal apparatus 20a related to the user 20a as the client and is received by the management server 10. In the explanation of the request process, a process by the management server 10 is a process by the server control unit 11. In the request process, for example, the management server 10 may firstly perform a request receiving process for the received request (step S201). In the present embodiment, the request receiving process is performed for the household service request transmitted from the terminal apparatus 20a related to the user 20a as the client. As the request receiving process, the management server 10 may assign the request ID to the received request and may generate the request information 131. Information to be set in the client information 131a and the requesting housework information 131b may be transmitted with the request, or may be transmitted from the terminal apparatus 20 (the terminal apparatus 20a in the present embodiment) in response to a request from the management server 10. Furthermore, the management server 10 may set the status 131c at the time of generating the request information 131 as "currently accepting".

Subsequently, the management server 10 may disclose information about the received request on the Internet 100 such that the information can be viewed on each terminal apparatus 20 (step S202). The information about the request may include, for example, at least a part of the client's address, and the requesting housework information 131b. For example, the management server 10 may manage a household service matching site opened on the Internet 100, and may post the information about the request on the site. In addition, the client's address to be disclosed may be such that an approximate location is recognizable, from the viewpoint of the Personal Information Protection Law.

Next, for example, the management server 10 may receive the acceptance indicating that it is desired to undertake the request, in an acceptance receiving period that is a predetermined period after the disclosure of the information about the request (step S203). For example, the acceptance receiving period may be set by time restriction, or may be set as an upper limit number that allows the acceptance to be received. In the example in FIG. 6, the request is viewed on the terminal apparatus 20b, the terminal apparatus 20d, and the terminal apparatus 20e, and the acceptance is transmitted from the terminal apparatus 20b and the terminal apparatus 20d, and these acceptances are received by the management server 10.

For example, after a lapse of the acceptance receiving period, the management server 10 may perform a determination process (step S204). After a lapse of the acceptance receiving period, the management server 10 may further end the disclosure of the information about the request. As the determination process, for example, the management server 10 may determine the formal consignee on the basis of a predetermined selection condition from among the consignment applicants related to the received acceptance. The selection condition may be set, for example, such that an optimal consignment applicant for the household service of the corresponding request is selected as the formal consignee. For example, the management server 10 may allow the consignment applicants to transmit their profiles with the acceptance, and a consignment applicant whose profile meets the most the consignee condition for the corresponding housework service may be selected as the formal consignee.

Alternatively, when the designated position to which the vehicle is dispatched is transmitted together with the acceptance, the formal consignee may be selected, for example, on the basis of a relationship between the designated position and the client's address. On the other hand, when receiving only one acceptance, the management server 10, for example, may determine as the formal consignee, the consignment applicant related to the received one acceptance. Alternatively, for example, the management server 10 may determine the formal consignee in order of arrival of the acceptance.

After determining the formal consignee, for example, the management server 10 may update the status 131c of the corresponding request to "determined" and may transmit the notice of determination to the terminal apparatus 20 related to the consignment applicant (i.e., the terminal apparatus 20 that has transmitted the acceptance). In the case of the example in FIG. 6, since the terminal apparatus 20 related to the consignment applicant is the terminal apparatus 20b and the terminal apparatus 20d, the management server 10 transmits the notice of determination to the terminal apparatus 20b and the terminal apparatus 20d. For example, when the user 20b has been determined as the formal consignee, the notice of determination transmitted to the terminal apparatus 20b may indicate that the corresponding user 20b has been determined as the formal consignee. On the other hand, the notice of determination transmitted to the terminal apparatus 20d may indicate that the corresponding user 20d has not been determined as the formal consignee. The notice of determination transmitted to the formal consignee may include the client's name and address. The notice of determination received by each terminal apparatus 20 may be outputted at the terminal apparatus 20 for the corresponding user to recognize the notice. The output at the terminal apparatus 20 allows the consignment applicant to recognize whether or not he/she has been determined as the formal consignee.

Then, a series of steps in the request process is ended.

Returning to FIG. 5, when the formal consignee is determined in the request process (the step S102), the server control unit 11 may perform a vehicle dispatching process (step S103). As the dispatching process, for example, the server control unit 11 may dispatch a vehicle for picking up the formal consignee, to the designated position designated by the consignee. When the formal consignee is the user 20b, the server control unit 11 dispatches a vehicle for picking up the user 20b, to a designated position specified by the user 20b. The dispatched vehicle may be an autonomous vehicle or a vehicle with a driver. The designated position specified by the formal consignee may be transmitted, for example, to the management server 10 with the acceptance. Alternatively, the designated position may be transmitted from the terminal apparatus 20 related to the formal consignee after the reception of the notice of determination.

Furthermore, for example, the server control unit 11 may encourage the dispatching of the vehicle to the designated position, as the dispatching process. That is, the server control unit 11 may instruct, for example, a management organization, a management center or the like to manage a vehicle for picking up the formal consignee, to dispatch the vehicle to the designated position. When the user 20d who is waiting in the MaaS vehicle MV has been determined as the formal consignee, for example, the user 20d may be driven to the designated position designated by the user 20d by the MaaS vehicle MV When the MaaS vehicle is an autonomous vehicle, the travel of the MaaS vehicle to the designated position may be controlled, for example, by the server control unit 11.

When the vehicle for picking up the formal consignee is dispatched to the designated position, for example, the server control unit 11 may perform a vehicle control process (step S104). As the vehicle control process, for example, the server control unit 11 may control a vehicle having picked up the formal consignee at the designated position, such that the vehicle arrives at the client's address. In a case that the vehicle is an autonomous vehicle, for example, the server control unit 11, when detecting that the formal consignee has been picked up, may control the traveling of the vehicle such that the vehicle starts traveling and arrives at the client's address. On the other hand, when the vehicle is a vehicle with a driver, the server control unit 11 may control a car navigation installed in the vehicle so as to start to guide a driving route from the current position (i.e., the designated position) to the client's address such that the vehicle arrives at the client's address, for example, by a predetermined operation by the driver, or by detecting the start of the travel of the vehicle that carries the formal consignee.

Then, a processing routine related to the request received from the client of the household service is ended.

The processes in the step S101 and the step S201 are performed by the request receiving unit 111 of the server control unit 11. The processes in the step S202, the step S203, the step S204, the step S103 and the step S104 are respectively performed by the request disclosing unit 112, the acceptance receiving unit 113, the determination unit 114, the vehicle dispatching unit 115, and the vehicle control unit 116 of the server control unit 11. When the server control unit 11 receives a notice of completion indicating the completion of the household service job from the terminal apparatus 20 related to the client or the formal consignee after performing the vehicle control process, the server control unit 11 may update the status 131c of the corresponding request information 131 to "completed".

When the user 20d has been determined as the formal consignee in a state that the user 20d and the user 20e are in the MaaS vehicle MV as illustrated in FIG. 1, for example, the MaaS vehicle MV may be controlled or used to drive the user 20d to the client's address as the mentioned vehicle, after dropping off the user 20e other than the user 20d (or in a state that the user 20e is still in the MaaS vehicle MV). When the Maas vehicle MV is an autonomous vehicle, the travel control of the MaaS vehicle may be performed, for example, by the server control unit 11.

Furthermore, the management server 10 may regularly disclose at predetermined intervals, a request related to the same request information 131 as a regular request. The designation of the regular request, such as the designation of a request to be set as the regular request and the designation of intervals of the disclosure of the regular request, may be configured to allow the user to make desired designation. For example, the server control unit 11 of the management server 10 may hold the request information 131 of the regular request even if the status 131c of the designated regular request is updated to "completed", may update the status 131c of the regular request to "currently accepting" at the designated intervals, and may disclose the requesting housework information 131b of the regular request together with at least a part of the client's address on the Internet 100.

As described above in detail, according to the first embodiment, a plurality of users can after viewing the content of household service and at least a part of the address, make application to be entrusted with the household service. For this reason, in exchange for undertaking the household service, the consignee can get in the vehicle that is dispatched to a position designated by himself or herself, and can go to the neighborhood of a place where the consignee wishes to go, for free by the vehicle. That is, the free ride by the vehicle may be an incentive to undertake this household service.

Second Embodiment

A second embodiment that is a modified example of the household service matching system 1 will be described. Referring to FIG. 7 to FIG. 10, parts different from those in the first embodiment will be described. FIG. 7 to FIG. 10 are drawings with the same subjects as those of FIG. 2, FIG. 3, FIG. 5 and FIG. 6 according to the first embodiment, respectively. In each of FIG. 7 to FIG. 10, the same reference numerals will be given to the same components as those in the first embodiment illustrated in each of FIG. 2, FIG. 3, FIG. 5 and FIG. 6, and the description thereof will be omitted as appropriate.

Figure 7:
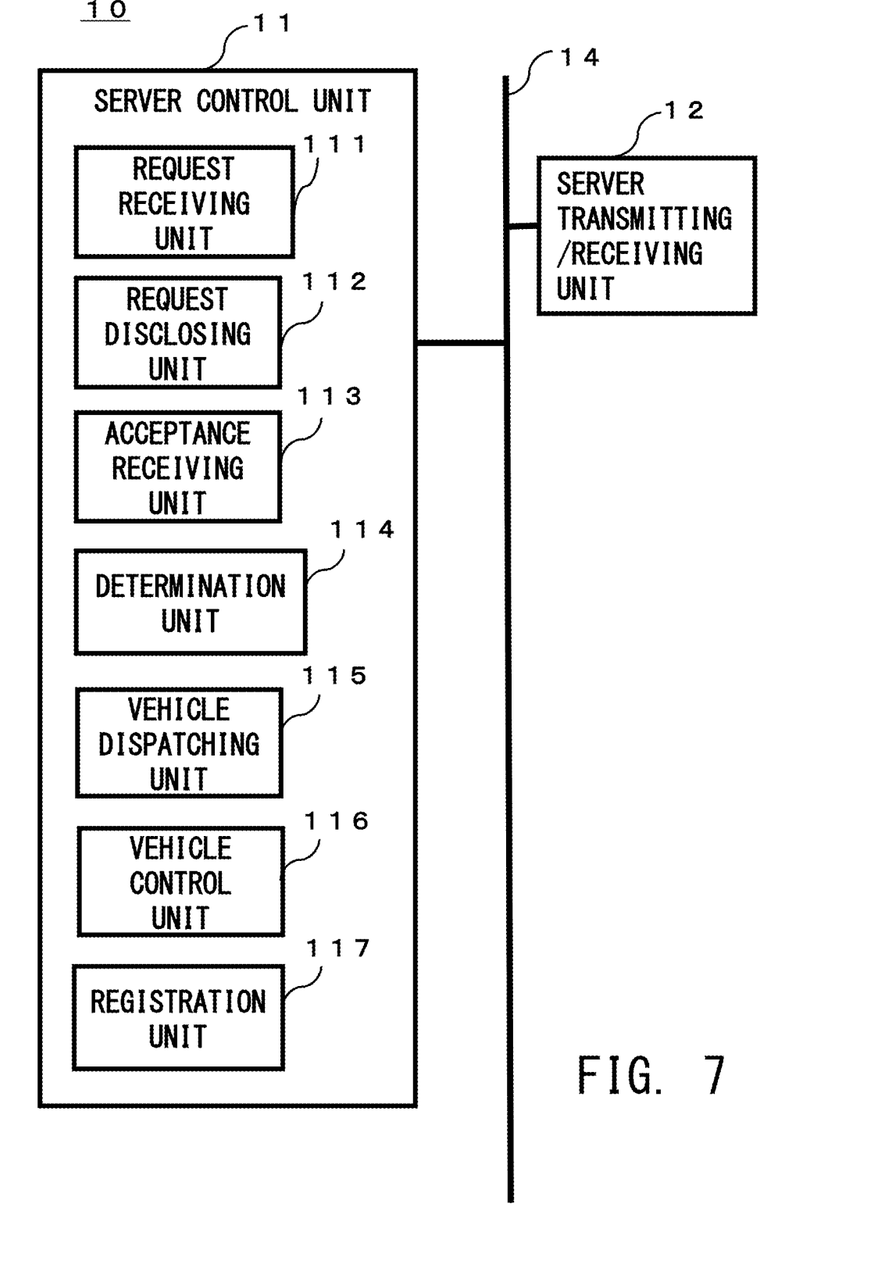
FIG. 7 is a block diagram of the same subject as that in FIG. 2, according to a second embodiment.
Figure 8:
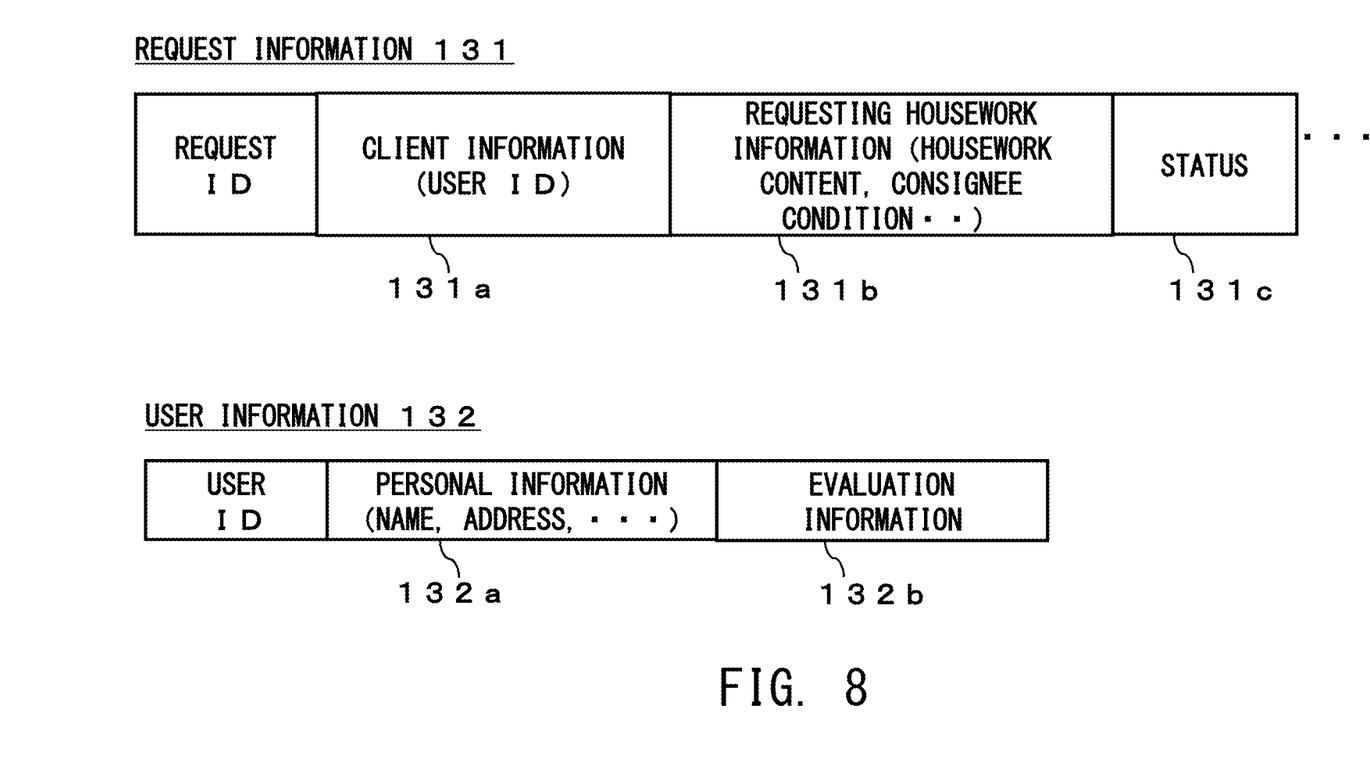
FIG. 8 is a data configuration diagram of the same subject as that in FIG. 3, according to the second embodiment.

The second embodiment is configured such that the matching of the household service is provided among the registered users. For example, as illustrated in FIG. 7, the server control unit 11 may further include a registration unit 117 that registers each user as a registrant of the household service matching system 1. The database 15 may further hold user information 132 that is information about each user, as illustrated in FIG. 8. In the user information 132, for example, personal information 132a, evaluation information 132b, and the like may be associated with a user ID for identifying each user in the household service matching system 1. The personal information 132a may include, for example, the user's name, address, contact address, or the like. The evaluation information 132b is information about evaluation of the household service performed by the user. The evaluation information 132b may be a numerical value or may be indicated by a level.

For example, when receiving a registration request from the terminal apparatus 20, the registration unit 117 may assign the user ID to the user of the terminal apparatus 20 that has transmitted the registration request, and may register information about the user as the user information 132. When the user information 132 is generated, the user who has transmitted the registration request is treated as the registrant in the household service matching system 1. Information set in the personal information 132a may be obtained, for example, by an input to the terminal apparatus 20 by the user. The evaluation information 132b may not be set when the user information 132 is generated. In the household service matching system 1 according to the second embodiment, the client, the consignment applicant, and the formal consignee are the registrants, and each registrant may be managed by the user ID. For example, the user ID corresponding to the client may be set in the client information 131a included in the request information 131 in the second embodiment.

Figure 9:
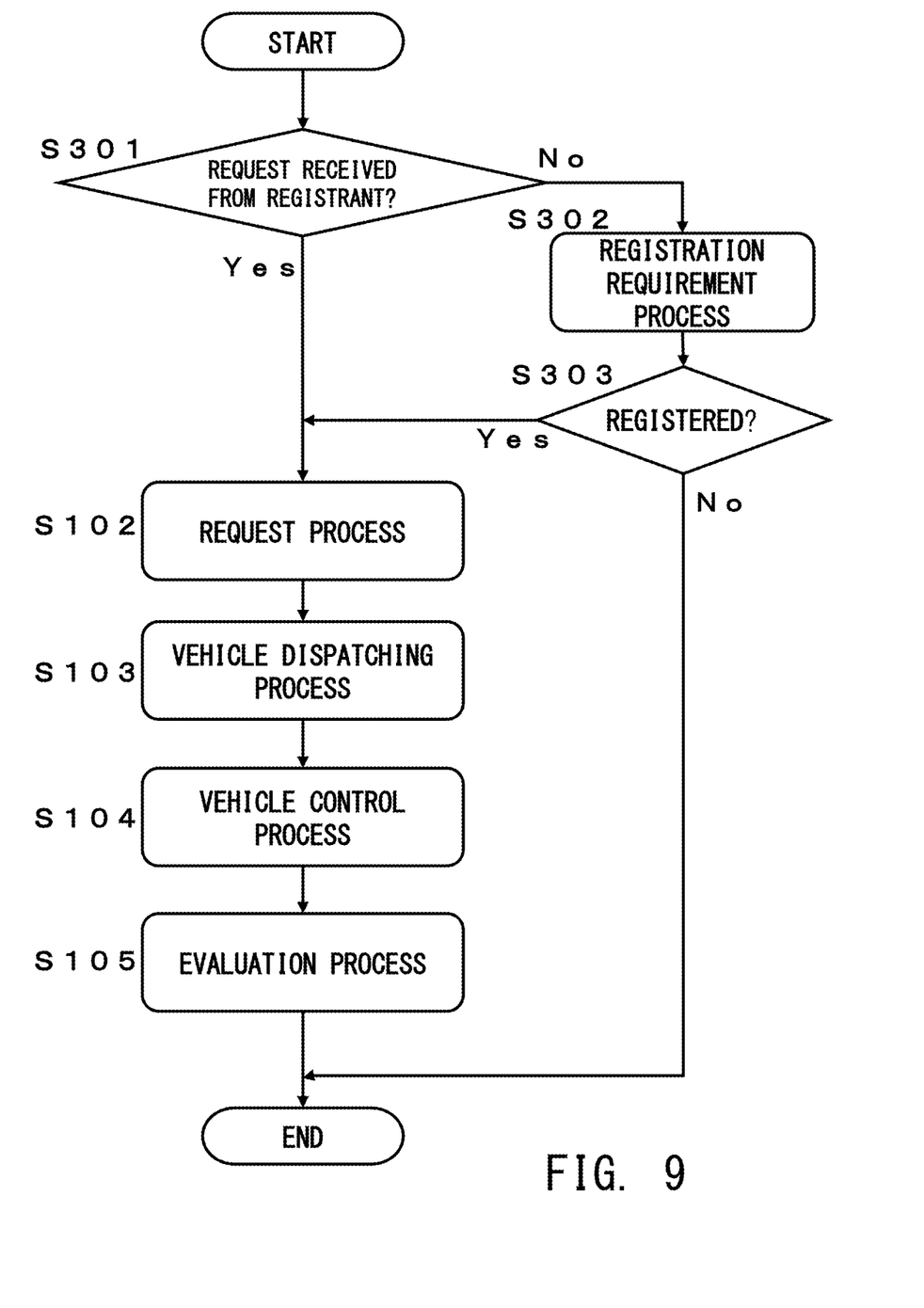
FIG. 9 is a flowchart of the same subject as that in FIG. 5, according to the second embodiment.

An example of a processing routine performed by the server control unit 11 with respect to the household service request in the second embodiment will be described with reference to FIG. 9. In the reception waiting state of waiting for the reception of the household service request from the registrant (step S301), when a sender of the received household service request is the registrant (the step S301: Yes), the server control unit 11 firstly may proceed to the request process (the step S102). On the other hand, when the sender of the received household service request is not the registrant (the step S301: No), the server control unit 11 may perform a registration requirement process (step S302). As the registration requirement process, for example, the server control unit 11 may require the sender of the household service request to register the user information 132 with respect to the sender. For example, the registration unit 117 of the server control unit 11 may, when receiving the registration request in response to this registration requirement, register the sender in the user information 132. Subsequently, the server control unit 11 may determine whether or not the user information 132 is registered with respect to the sender to whom the registration has been required (step S303). When determining that the user information 132 is registered (the step S303: Yes), the server control unit 11 may proceed to the request process (the step S102). On the other hand, when determining that the user information 132 is not registered (the step S303: No), for example, the server control unit 11 may end the processing routine that is being executed. Thus, the server control unit 11 may receive the household service request on condition that the user information 132 about the client is registered.

Figure 10:
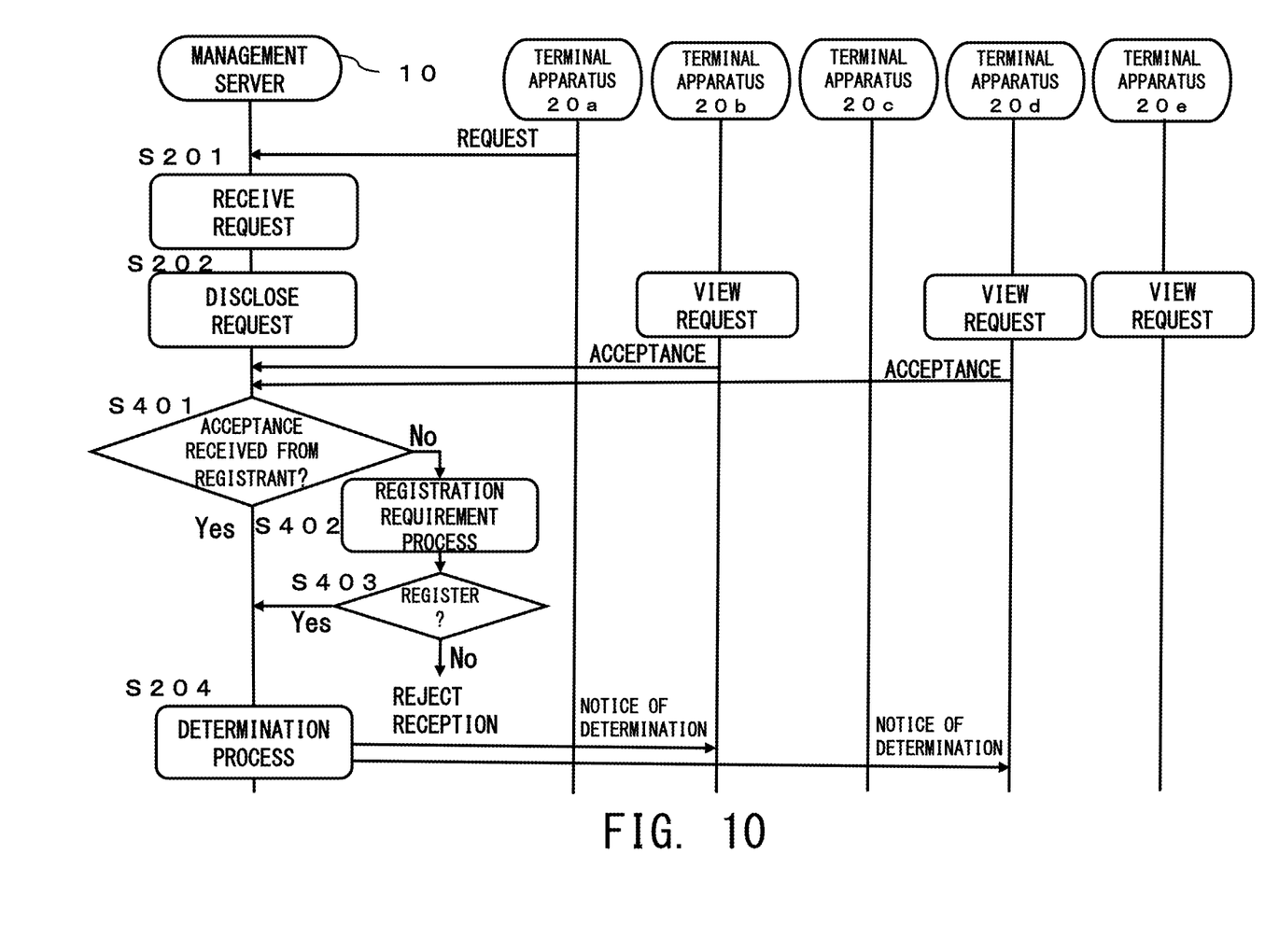
FIG. 10 is a sequence diagram of the same subject as that in FIG. 6, according to the second embodiment.

The request process (the step S102) in the second embodiment will be described with reference to FIG. 10. The step S201 and the step S202 are the same as those in the first embodiment. In the step S201, however, the user 20a as the client may be treated as the registrant registered in advance or registered through the registration requirement process (FIG. 9: the step S302). In the step S202, as in the first embodiment, the information about the household service request may be disclosed on the Internet 100 such that the information is viewed on all the terminal apparatuses 20, regardless of whether or not the respective terminal apparatuses 20 are related to the registrants.

Subsequently, the server control unit 11 may be brought into a reception waiting state of waiting for the reception of the acceptance from the registrant, in the acceptance receiving period (step S401). When a sender of the received acceptance is the registrant (the step S401: Yes), the server control unit 11 may proceed to the determination process (the step S204) with respect to the corresponding acceptance. On the other hand, when the sender of the received acceptance is not the registrant (the step S401: No), the server control unit 11 may perform a registration requirement process (step S402). As the registration requirement process, for example, the server control unit 11 may require the sender of the acceptance to register the user information 132 with respect to the sender. For example, the registration unit 117 of the server control unit 11 may, when receiving the registration request in response to this registration requirement, register the sender in the user information 132. Subsequently, the server control unit 11 may determine whether or not the user information 132 is registered with respect to the sender (step S403). When determining that the user information 132 is registered (the step S403: Yes), the server control unit 11 may proceed to the determination process (the step S204) with respect to the corresponding acceptance. On the other hand, when determining that the user information 132 is not registered (the step S403: No), for example, the server control unit 11 may reject the reception of the corresponding acceptance. In the present embodiment, it is assumed that each of the user 20b and the user 20d who have transmitted the acceptance is the registrant registered in advance or registered through the registration requirement process (the step S402). Therefore, the reception of each acceptance is not rejected and is moved to the determination process. As described above, the server control unit 11 may receive the acceptance on condition of the registration of the user information 132 with respect to the consignment applicant.

The determination process in the step S204 is similar to the corresponding process in the first embodiment. Returning to FIG. 9, the processes in the step S103 to the step S104 are also the same as the corresponding processes in the first embodiment.

In the second embodiment, after the vehicle control process (the step S104), the server control unit 11 may perform an evaluation process (step S105). For example, the server control unit 11 may perform the evaluation process when receiving a notice of completion of the household service job from the formal consignee or the client. As the evaluation process, for example, the server control unit 11 may allow the client to evaluate the household service job performed by the formal consignee and to transmit the evaluation to the management server 10. Subsequently, the server control unit 11 may update the evaluation information 132b included in the user information 132 with respect to the formal consignee on the basis of the evaluation transmitted from the client. Thus, if the evaluation information 132b is configured to be updated by the evaluation of the client, the evaluation information 132b can be used as a comprehensive evaluation of past household service jobs of the corresponding user. For example, the mentioned selection condition may be set as follows; the evaluation information 132b of the consignment applicant is referred to in the determination process in which the formal consignee is determined (the step S204), and as the evaluation information 132b indicates a higher evaluation, the corresponding consignment applicant is more easily selected as the formal consignee.

The processes in the step S301 to the step S303 and the step S20.1 are performed by the request receiving unit 111 of the server control unit 11. The process in the step S202 is performed by the request disclosing unit 112 of the server control unit 11. The processes in the step S401 to the step S403 are performed by the acceptance receiving unit 113 of the server control unit 11. The processes in the step S204, the step S103, the step S104, and the step S105 are respectively performed by the determination unit 114, the vehicle dispatching unit 115, the vehicle control unit 116, and the registration unit 117 of the server control unit 11.

As described above in detail, according to the second embodiment, it is possible to provide a matching environment of the household service among the registered users. Furthermore, the evaluation of the household service agent is also possible, and the evaluation can be used as a parameter in determining the formal consignee. In this case, a person with a high degree of satisfaction of the clients can be determined as the formal consignee, and a person with a low degree of satisfaction of the clients can be eliminated.

<Supplementary Notes>

With respect to the embodiments described above, the following Supplementary Notes are further disclosed.

Supplementary Note 1

A household service matching system described in Supplementary Note 1 according to embodiments of the present disclosure is a household service matching system built on a communication network to perform household service matching between a client who entrusts household service and a consignee who is entrusted with the household service, the household service matching system comprising: a request receiving unit configured to receive a household service request for requesting the household service, from a terminal apparatus related to the client; a request disclosing unit configured to disclose on the communication network the received household service request together with at least a part of the client's address, for viewing on each of a plurality of terminal apparatuses; an acceptance receiving unit configured to receive an acceptance transmitted from a terminal apparatus among the plurality of terminal apparatuses, the terminal apparatus being related to a consignment applicant wishing to be entrusted with the household service related to the household service request disclosed; a determination unit configured to determine a formal consignee based on the acceptance received; a vehicle dispatching unit configured to dispatch a vehicle to a designated position designated by the formal consignee determined, or to encourage dispatching of the vehicle to the designated position; and a vehicle control unit configured to control the vehicle so as for the vehicle having picked up the formal consignee at the designated position to arrive at an address of the client, or so as to encourage the vehicle having picked up the formal consignee at the designated position to arrive at the address.

According to the household service matching system described in Supplementary Note 1, the consignment applicant may wish to be entrusted after viewing the content of the household service and at least a part of the address. For this reason, in exchange for undertaking the household service, the formal consignee can get in the vehicle that is dispatched to the designated position designated by himself or herself, and can go to the neighborhood of a place where the formal consignee wishes to go (e.g., home, various facilities, a next destination of work including next household service) for free by the vehicle. That is, the free ride by the vehicle may be an incentive to undertake this household service. As a consequence, the balance could be facilitated between the number of those who wish to entrust household service and the number of those who wish to be entrusted with the household service, and even if the household service are free of charge, the matching process on the system could be allowed to function satisfactorily.

Supplementary Note 2

A household service matching system described in Supplementary Note 2 according to embodiments of the present disclosure is the household service matching system described in Supplementary Note 1, wherein at least one terminal apparatus of the plurality of terminal apparatuses is provided in a MaaS (Mobility as a Service) vehicle where at least one occupant who could be the consignment applicant rides, the at least one terminal apparatus being correlated to the at least one occupant, the acceptance receiving unit is configured to receive the acceptance from the terminal apparatus corresponding to the occupant as the consignment applicant, and the vehicle control unit is configured to when the occupant as the consignment applicant is determined as the formal consignee, control the MaaS vehicle so as for the MaaS vehicle carrying the occupant determined as the formal consignee to arrive at the address of the client, or so as to encourage that the MaaS vehicle carrying the occupant determined as the formal consignee arrives at the address of the client.

According to the household service matching system described in Supplementary Note 2, it is possible to provide the occupant with the MaaS vehicle as a waiting place for being entrusted with the household service, and when the occupant of the MaaS vehicle is determined as the formal consignee, the consignee can stay in the MaaS vehicle and can go to the vicinity of a place where the consignee wishes to go, for free. In this case, since a time for dispatching the vehicle is not required, it is possible to provide efficient movement for the consignee, and it is also possible to accelerate a start time of the household service at the client's home.

Supplementary Note 3

A household service matching system described in Supplementary Note 3 according to embodiments of the present disclosure is the household service matching system described in Supplementary Note 1, further comprising a registration unit configured to register user information that is information with respect to each of a plurality of users who could be the client or the consignment applicant, via the terminal apparatus related to the user, wherein the request receiving unit is configured to receive the household service request related to the client, on condition that the user information with respect to the client is registered, and the acceptance receiving unit is configured to receive the acceptance related to the consignment applicant, on condition that the user information with respect to the consignment applicant is registered.

According to the household service matching system described in Supplementary Note 3, the household service request is disclosed without limitation on the communication network, whereas the household service matching can be provided only among the registered users. By adopting a registration system, a system operation manager or the like can confirm and/or examine the information with respect to each user at any time. Thus, for example, in an environment that allows the matching of the consignee and the client who are not acquaintances, it is possible to increase a sense of security and safety of both the consignee and the client.

Supplementary Note 4

A household service matching system described in Supplementary Note 4 according to embodiments of the present disclosure is the household service matching system described in Supplementary Note 3, wherein the registration unit is configured to allow the client to evaluate the household service performed by the formal consignee, and use an evaluation by the client to update evaluation information included in the user information with respect to the formal consignee, and the determination unit is configured to determine the formal consignee with reference to the evaluation information of the consignment applicant related to the acceptance received.

According to the household service matching system described in Supplementary Note 4, for example, the consignment applicant with a high evaluation of past household service jobs can be determined as the formal consignee, whereas the consignment applicant with a low evaluation can be excluded from the formal consignee. This leads to peaceful and smooth practice of the household service.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A household service matching system built on a communication network to perform household service matching between a client who entrusts household service and a consignee who is entrusted with the household service, the household service matching system comprising:
   a request receiving unit configured to receive a household service request for requesting the household service, from a terminal apparatus related to the client;
   a request disclosing unit configured to disclose on the communication network the received household service request together with at least a part of the client's address, for viewing on each of a plurality of terminal apparatuses;
   an acceptance receiving unit configured to receive an acceptance transmitted from a terminal apparatus among the plurality of terminal apparatuses, the terminal apparatus being related to a consignment applicant wishing to be entrusted with the household service related to the household service request disclosed;
   a determination unit configured to determine a formal consignee based on the acceptance received;
   a vehicle dispatching unit configured to dispatch a vehicle to a designated position designated by the formal consignee determined, or to encourage dispatching of the vehicle to the designated position; and
   a vehicle control unit configured to control the vehicle so as for the vehicle having picked up the formal consignee at the designated position to arrive at an address of the client, or so as to encourage the vehicle having picked up the formal consignee at the designated position to arrive at the address.

2. The household service matching system according to claim 1, wherein
   at least one terminal apparatus of the plurality of terminal apparatuses is provided in a MaaS (Mobility as a Service) vehicle where at least one occupant who could be the consignment applicant rides, the at least one terminal apparatus being correlated to the at least one occupant,
   the acceptance receiving unit is configured to receive the acceptance from the terminal apparatus corresponding to the occupant as the consignment applicant, and
   the vehicle control unit is configured to when the occupant as the consignment applicant is determined as the formal consignee, control the MaaS vehicle so as for the MaaS vehicle carrying the occupant determined as the formal consignee to arrive at the address of the client, or so as to encourage that the MaaS vehicle carrying the occupant determined as the formal consignee arrives at the address of the client.

3. The household service matching system according to claim 1, further comprising a registration unit configured to register user information that is information with respect to each of a plurality of users who could be the client or the consignment applicant, via the terminal apparatus related to the user, wherein
   the request receiving unit is configured to receive the household service request related to the client, on condition that the user information with respect to the client is registered, and
   the acceptance receiving unit is configured to receive the acceptance related to the consignment applicant, on condition that the user information with respect to the consignment applicant is registered.

4. The household service matching system according to claim 3, wherein
   the registration unit is configured to allow the client to evaluate the household service performed by the formal consignee, and use an evaluation by the client to update evaluation information included in the user information with respect to the formal consignee, and
   the determination unit is configured to determine the formal consignee with reference to the evaluation information of the consignment applicant related to the acceptance received.

* * * * *